Nov. 30, 1943.   L. D. JONES   2,335,420
OIL PURIFYING SYSTEM FOR VEHICLES
Filed April 26, 1941
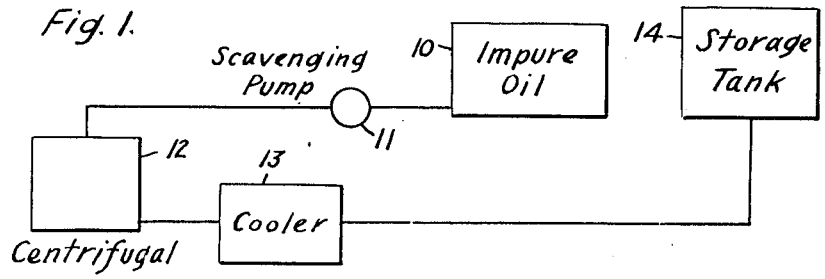
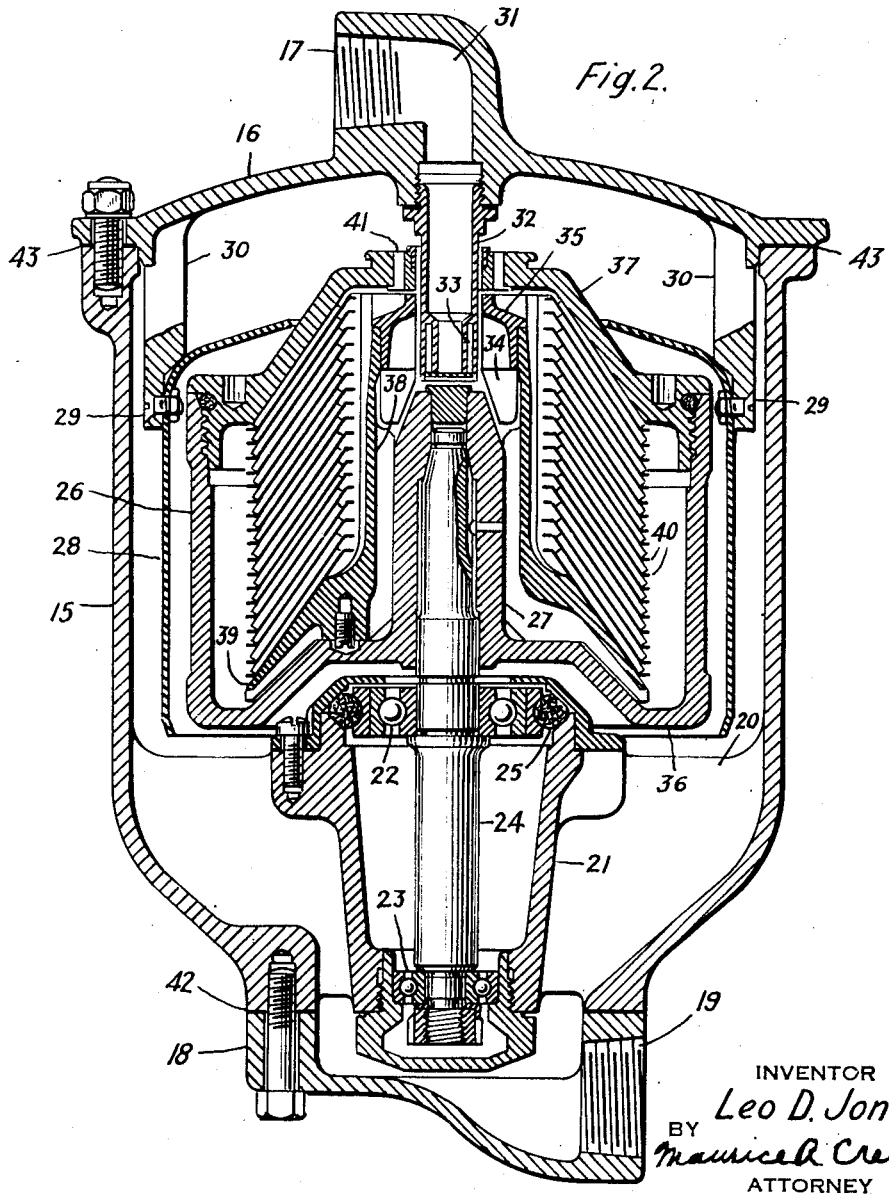
INVENTOR
Leo D. Jones
BY
Maurice R. Crews
ATTORNEY Patented Nov. 30, 1943

2,335,420

UNITED STATES PATENT OFFICE 2,335,420

OIL PURIFYING SYSTEM FOR VEHICLES

Leo D. Jones, Philadelphia, Pa., assignor to The Sharples Corporation, Philadelphia, Pa., a corporation of Delaware Application April 26, 1941, Serial No. 390,462

12 Claims. (Cl. 233—11)

The present invention involves an improved oil purifying system for a vehicle motor. It relates to a system of the general type described and claimed in my prior application, Serial No. 319,587, filed February 19, 1940, for Centrifugal purification of liquids.

In the conception of the present invention, as in the conception of the invention of my prior application, above identified, a primary consideration has been to provide an oil purifying system having particular utility for installation on aircraft. In my prior application, I described and claimed an arrangement involving removal of the oil from the crank case by a scavenging pump, feed of the oil under pressure of the pump to a centrifugal rotor, and driving of the rotor by turbine effect obtained from pressure of the oil derived from the pump, the oil being purified in a centrifugal rotor thus driven by the oil itself. In the arrangement of my prior application, the oil is discharged from the centrifugal rotor to a pressure which is substantially atmospheric. After discharge from the rotor, the oil drops by gravity into a receiving tank.

In the actual installation of the system described in my prior application, the oil passed through an oil cooler in flowing from the scavenging pump to the centrifugal. The operation of the centrifugal required that the oil be under substantial pressure as it entered the centrifugal, in order to provide the necessary energy to effect the turbo-drive of the centrifugal. The cooler was necessarily subjected to an even slightly higher pressure than that of the oil entering the centrifugal, since the cooler was on the upstream side of the centrifugal with respect to the direction of oil flow. The oil cooler was an apparatus having a somewhat complicated system of small passages, and included very large surfaces of thin metal, with the result that it was incapable of resisting high pressures.

It would have been possible to avoid subjecting the oil cooler to high pressures by using an additional pump, one pump being provided to feed the oil through the cooler, and a separate pump for passing it to the centrifugal after it left the cooler. But such an arrangement would have been subject to the serious drawback of increasing the cost of the installation, and also to the even much more serious drawback of adding weight to the installation, a consideration of primary importance in connection with aircraft. A feature of the present invention consists in the fact that it involves a system by which the oil may be fed under relatively low pressure through the cooler, without adding any weight or expense to the installation, and without sacrificing any of the advantages of the prior system.

In the practice of the invention of my prior application, the oil was discharged from the centrifugal by gravity into the receiving tank. As a consequence of this fact, it was necessary that the centrifugal be mounted at a point above that tank. Since space is a primary consideration in aircraft design, an arrangement of this kind is not always permissible. A further feature of the present invention consists in the fact that it involves an arrangement by which the centrifugal may be mounted lower than the tank to which oil is fed from the centrifugal, without adding any weight or other undesirable complications to the installation.

Further features and advantages of the invention will be evident from a reading of the following specification in the light of the attached drawing, in which, Figure 1 is a flow sheet, illustrating the arrangement of the primary units in a system embodying the principles of the invention, and Figure 2 is a central axial section through a centrifugal separator designed to be used in the practice of the invention.

In the system of the invention, impure oil to be treated may be obtained from any source of such contaminated oil 10, such as the crank case of an airplane engine. This oil is removed by a scavenging pump 11, which may be mounted directly in the crank case of the engine, as in conventional aviation engine design. Such a pump must necessarily have a displacement sufficient to remove oil from the crank case at a greater rate than the maximum rate at which oil is ever pumped into the crank case. The difference between the displacement capacity of the pump and the rate of feed of oil to the crank case accordingly entails pumping of a considerable quantity of gas from the crank case, along with the oil.

The centrifugal 12 is preferably of the same general type with respect to drive as that described and claimed in my prior application, Serial No. 319,587, discussed above, in that it is driven by turbo effect from the pressure of the oil fed to the centrifugal rotor. This turbo drive may be obtained by providing an impulse turbine in the feed zone of the centrifugal, by directing the discharge outlets of the centrifugal backwardly with respect to the direction of rotor rotation, or by both of these expedients, as taught in my prior application.

A novel feature of the invention consists in the fact that the mixture of purified oil and gas discharged from the centrifugal rotor is discharged into a vapor-proof casing, which is connected with the conduit through which the oil is to be passed to the tank in which it is to be stored, the oil being passed through a cooler 13 en route to the storage tank 14, if cooling is necessary. By providing a vapor-proof casing surrounding the centrifugal rotor, the oil is passed through the cooler to the storage tank 14 under the pressure of gas released from the oil upon discharge into the centrifugal casing.

A preferred construction of centrifugal for use in practice of the invention is illustrated in Figure 2. In this centrifugal, the rotor and associated parts are secured within a casing 15, which is provided with a cover 16 having a screw threaded connection 17 for securement to the conduit which directs the liquid to be purified from the scavenging pump to the centrifugal. A base portion 18 is secured at the under end of the casing 15, and this base portion is also provided with a screw threaded connection 19 for connection with the conduit which directs the oil through the cooler 13 to the storage tank 14.

A plurality of wings 20 project inwardly from the bottom part of the casing 15, and these wings support a tubular bearing housing 21. Longitudinally spaced ball bearings 22 and 23 are secured within this bearing housing, and support the lower end of the shaft 24 of the centrifugal rotor for rotation within the housing. The upper bearing 22 may be flexibly supported by means of an elastic ring 25, as will be well understood by those familiar with the centrifugal art. The centrifugal rotor 26 is secured to the upper end of the shaft 24 for rotation therewith, by sliding the bearing sleeve 27 at the base of the centrifugal rotor over the upper end of the shaft 24.

An annular guard 28 is preferably provided, and this guard surrounds the outer wall of the centrifugal rotor, to prevent liquid discharged from the rotor from contacting the outer wall of the rotor and acting to retard the rotation thereof. This guard may be detachably secured in place by means of bolts 29 secured in brackets 30 which extend downwardly from the casing cover 15.

The screw threaded connection 17 through which oil is received from pump 11 is connected, by an internal passage 31 in the cover 16, with a centrifugal feed nozzle 32, which is secured centrally to the under side of the cover 16. The nozzle 32 projects downwardly into the upper end of the centrifugal rotor 26, and the lower end of this nozzle 32 is provided with passages for deflecting oil tangentially against a turbine wheel mounted in the upper end of the centrifugal. The lower end of the feed nozzle 32 thus constitutes a turbine nozzle 33 which causes the oil to be projected against the wings 34 of a turbine wheel 35 mounted in the upper end of the centrifugal rotor 26, and to drive this turbine wheel and the centrifugal rotor.

The centrifugal rotor consists of a main body portion 36 and a top section 37 which may be secured together by screw threaded engagement, as illustrated. The central portion of the main body section 36 constitutes the central sleeve 27 of the rotor which fits over the upper end of the shaft 24, as discussed above. A central feed tube 38 surrounds the sleeve 27 and is secured for rotation with the main body 26 of the rotor. This feed tube is provided with suitable accelerator wings, as will be well understood by those skilled in the art, and has a flange 39 dependent from its lower end. The flange 39 is spaced from the base of the rotor in order to provide a feed passage for incoming liquid, to direct that liquid to an annular zone removed from the center of the rotor. Closely spaced, nested, frusto-conical discs 40 occupy the space between the upper wall 37 of the centrifugal rotor and the flange 39, and the spaces between successive discs constitute a plurality of very shallow superposed clarifying chambers.

After purification of the oil by passage through the spaces between the stratifying discs 40, that oil is passed inwardly and discharged from the rotor through outlets 41. These outlets are preferably directed backwardly with respect to the direction of the rotor rotation, in order to conserve a part of the energy in the liquid subjected to discharge by the reaction from discharge of this liquid in a direction opposed to the direction of rotation of the rotor. The outlets 41 thus constitute, in effect, a reaction turbine wheel, while the wheel 35 and associated blades 34 constitute an impulse turbine wheel. While it is desirable that the rotor be driven by turbo action derived from the energy in the liquid fed thereto, it is not necessary that the exact type of turbine here illustrated be used. The rotor might, for example, be driven solely by impulse turbine effect, or solely by reaction turbine effect within the broad principles of the invention, and I do not wish to be limited to the use of any particular type of turbine drive in the practice of the invention. As a matter of fact, it is not absolutely essential to the practice of the invention that the rotor be driven by the liquid under treatment, for it is possible to drive the rotor from an external source of power while obtaining the advantages in passage of liquid discharged from the rotor through apparatus on the downstream side of the rotor, within the broad principles of the invention.

Liquid discharged from the rotor through outlets 41 passes around the outside of the annular guard 28 and is discharged from the casing through the conduit connecting the screw threaded connection 19 at the base of the casing with the oil cooler 13 as illustrated in Figure 1. The pump 11 is operated in such a manner as to pump a considerable quantity of air or other gas, along with the liquid under treatment, to the centrifugal rotor. This gas is maintained in the liquid until the liquid is passed to the centrifugal separator, but separates from the liquid in the centrifugal casing. In the use of an ordinary open type centrifugal such as employed in the practice of the invention of my prior application, Serial No. 319,587, identified above, any gas released from the liquid in this manner escapes through unsealed portions of the casing or is discharged with the oil into the receiving tank of that application. In the practice of the present invention, on the other hand, pressure derived from this gas is employed to cause the oil to flow through the cooler 13 or to pass to an oil storage tank 14 which may be at a higher level than the centrifugal 12, or to perform both of these useful functions, as illustrated in Figure 1 of the drawing.

In the practice of the invention, the utilization of the gas entrained in the liquid under treatment to effect feed of that liquid under pressure beyond the centrifugal is obtained by sealing all possible outlets for escape of gas from the centrifugal casing 15, and connecting this casing only with the conduits through which liquid is fed to the centrifugal rotor and discharged from the casing. Thus, the base portion 18 of the casing is secured to the main body portion 15 in vapor-proof relation by means of a gasket 42, or other suitable sealing connection, and a similar sealing connection 43 is secured between the top portion 16 of the casing and the main body portion thereof.

Upon discharge of liquid from the casing through the screw threaded connection 19 and associated conduits, the liquid flows toward the oil cooler 13. If there is not sufficient pressure within the casing 15 to force the oil through this cooler and/or to the storage tank 14 at this time, oil will accumulate in the centrifugal casing. As more oil and gas are fed to the centrifugal, the accumulation of gas in the casing 15 gradually develops a pressure sufficient to force the oil (or other liquid) through the cooler 13 and to the storage tank 14. As the operation continues, the oil will be continuously passed through the centrifugal and from the centrifugal through the cooler 13 to the storage tank 14 under pressure maintained in the casing 15. Once the flow is established through the cooler 13 to the storage tank 14, the maintenance of the required pressure in the casing 15 to discharge oil to the storage tank 14 from that casing will be automatic.

From the above discussion, it will be evident that the invention provides an arrangement by which the oil cooler 13 does not need to be subjected to any pressure substantially higher than the amount of pressure necessary to impel the oil through this element of the apparatus alone, and to the storage tank. The system thus enables us to avoid imposition on the interior of the oil cooler of the pressure necessary to drive the centrifugal, but this result is accomplished without adding any primary element to the combination of parts, such as an additional pump. At the same time, there is no chance of flooding the centrifugal casing with oil, and thereby imposing upon the centrifugal driving system the requirement of furnishing energy to overcome the additional friction which would occur if oil surrounded the rotor. As will be evident from the drawing, the oil is removed from the centrifugal casing at the bottom of that casing, and the pressure within the casing causes this oil to be continuously removed from the casing after discharge from the centrifugal rotor, thereby avoiding rise of the oil level in the container 15 into contact with the centrifugal rotor.

While the advantages of the invention have been particularly described in connection with a system employing an oil cooler, it will be evident that these advantages are also important even though the oil cooler may be omitted. Thus, in cases in which it is desirable that the storage tank 14 be mounted at a higher point than the centrifugal 12, the system of the invention renders the feed of liquid uphill from the centrifugal 12 to the storage tank 14 possible without addition of apparatus involving further expense or additional weight.

Still further modifications will be obvious to those skilled in the art, and I do not therefore wish to be limited except by the scope of the following claims. For example, instead of feeding a mixture of liquid and gas to and through the centrifugal rotor, and depending upon the pressure developed by discharge of this gas into the casing for feeding the liquid under super-atmospheric pressure from the casing, it is possible to inject a gas separately into the casing surrounding the rotor in order to develop the necessary pressure to feed the liquid from the casing to the desired point.

I claim:

1. In an oil purification system for vehicles, the combination comprising, means for feeding a mixture of oil and a gas to the rotor of a centrifugal oil purifier under super-atmospheric pressure, a casing surrounding said rotor, substantially vapor-proof connections for preventing leakage of gas from said casing directly to the outside atmosphere, and flow resisting means including a conduit connected to said casing below the top of said casing to receive oil discharged therefrom and interconnected at its opposite end with a zone of lower pressure than that developed in said casing, whereby pressure developed upon discharge of said gas into said casing impels said oil through said flow resisting means.

2. In an oil purification system for vehicles, the combination comprising, means for feeding a mixture of oil and a gas to the rotor of a centrifugal oil purifier under super-atmospheric pressure, a casing surrounding said rotor, a turbine associated with said rotor for driving said rotor under the impelling effect of the pressure of said oil, substantially vapor-proof connections for preventing leakage of gas from said casing directly to the outside atmosphere, and flow resisting means including a conduit connected to said casing below the zone of discharge of oil from said rotor to receive oil discharged from said casing, said conduit being interconnected at its opposite end with a zone of lower pressure than that developed in said casing, whereby pressure developed upon discharge of said gas into said casing impels said oil through said flow resisting means.

3. In an oil purification system for vehicles, the combination comprising, a casing, connections for feeding oil and a gas to said casing, means for feeding both said oil and said gas to said casing under super-atmospheric pressure, a rotor mounted within said casing and means for rotating said rotor to effect purification of oil fed to the interior thereof, said rotor being provided with outlets for discharging oil therefrom into said casing, substantially vapor-proof connections for preventing leakage of gas from said casing directly to the outside atmosphere, and flow resisting means including a conduit connected to said casing below the zone of discharge of oil from said rotor to receive oil discharged from said casing, said conduit being interconnected at its opposite end with a zone of lower pressure than that developed in said casing, whereby pressure developed upon discharge of said gas into said casing impels said oil through said flow resisting means.

4. An oil purification system as defined in claim 3, in which the centrifugal rotor is provided with turbine means for driving said rotor under the impelling effect of the pressure of the oil fed to the rotor for treatment therein.

5. In an oil purification system for vehicles, the combination comprising, a pump for feeding a mixture of oil and a gas to the rotor of a centrifugal oil purifier under super-atmospheric pressure, a casing surrounding said rotor, substantially vapor-proof connections for preventing leakage of gas from said casing directly to the outside atmosphere, and flow resisting means including a conduit connected to said casing below the zone of discharge of oil from said rotor to receive oil discharged from said casing, said conduit being interconnected at its opposite end with a zone of lower pressure than that developed in said casing, whereby pressure developed upon discharge of said gas into said casing impels said oil through said flow resisting means.

6. In an oil purification system for vehicles, the combination comprising, means for feeding a mixture of oil and a gas to the rotor of a centrifugal oil purifier under super-atmospheric pressure, a casing surrounding said rotor, substantially vapor-proof connections for preventing leakage of gas from said casing directly to the outside atmosphere, and flow resisting menas including a conduit connected to said casing below the zone of discharge of oil from said rotor and an oil cooler connected to said conduit to receive oil discharged therefrom and maintained at a lower pressure than that developed in said casing, whereby pressure developed upon discharge of said gas into said casing impels said oil through said conduit and oil cooler.

7. In an oil purification system for vehicles, the combination comprising, means for feeding a mixture of oil and a gas to the rotor of a centrifugal oil purifier under super-atmospheric pressure, a casing surrounding said rotor, substantially vapor-proof connections for preventing leakage of gas from said casing directly to the outside atmosphere, a storage reservoir located at a higher level than the bottom of said casing and maintained at a lower pressure than that developed in said casing, and a conduit connecting a part of said casing below the zone of discharge of oil from said rotor to said storage reservoir, whereby pressure developed upon discharge of said gas into said casing impels said oil through said conduit to said storage reservoir.

8. In an oil purification system for vehicles, the combination comprising, a casing, connections for feeding oil and a gas to said casing, means for feeding both said oil and said gas to said casing under super-atmospheric pressure, a rotor mounted within said casing and means for rotating said rotor to effect purification of oil fed to the interior thereof, said rotor being provided with outlets for discharging oil therefrom into said casing, substantially vapor-proof connections for preventing leakage of gas from said casing directly to the outside atmosphere, and flow resisting means including a conduit connected to said casing at a point thereof below said centrifugal rotor to receive oil discharged from said rotor and interconnected at its opposite end with a zone of lower pressure than that developed in said casing, whereby pressure developed by passage of said gas into the space of said casing surrounding said centrifugal rotor impels said oil through said flow resisting means.

9. In a liquid purification system, the combination comprising, a casing, connections for feeding liquid and a gas to said casing, means for feeding both said liquid and said gas to said casing under super-atmospheric pressure, a rotor mounted within said casing and means for rotating said rotor to effect purification of liquid fed to the interior thereof, said rotor being provided with outlets for discharging liquid therefrom into said casing, substantially vapor-proof connections for preventing leakage of gas from said casing directly to the outside atmosphere, and flow resisting means including a conduit connected to said casing below the zone of discharge of oil from said rotor to receive liquid discharged from said casing, said conduit being interconnected at its opposite end with a zone of lower pressure than that developed in said casing, whereby pressure developed by passage of said gas into the space of said casing surrounding said centrifugal rotor impels said liquid through said flow resisting means.

10. In an oil purification system for vehicles, the combination comprising, a crank case, a scavenging pump for removing oil from the crank case and feeding a mixture of the oil and a gas to the rotor of a centrifugal oil purifier under super-atmospheric pressure, a casing surrounding said rotor, substantially vapor-proof connections for preventing leakage of gas from said casing directly to the outside atmosphere, and flow resisting means including a conduit connected to said casing below the zone of discharge of oil from said rotor to receive oil discharged from said casing, said conduit being interconnected at its opposite end with a zone of lower pressure than that developed in said casing, whereby pressure developed upon discharge of said gas into said casing impels said oil through said flow resisting means.

11. In an oil purification system for vehicles, the combination comprising, a crank case, a scavenging pump for removing oil from the crank case and feeding a mixture of the oil and a gas to the rotor of a centrifugal oil purifier under super-atmospheric pressure, a casing surrounding said rotor, substantially vapor-proof connections for preventing leakage of gas from said casing directly to the outside atmosphere, and flow resisting means including a conduit connected to said casing below the zone of discharge of oil from said rotor and an oil cooler connected to said conduit to receive oil discharged from said casing and maintained at a lower pressure than that developed in said casing, whereby pressure developed upon discharge of said gas into said casing impels said oil through said flow resisting means.

12. In an oil purification system for vehicles the combination comprising, means for feeding a mixture of oil and a gas to the rotor of a centrifugal oil purifier under super-atmospheric pressure, a casing surrounding said rotor, substantially vapor-proof connections for preventing leakage of gas from said casing directly to the outside atmosphere, and flow resisting means including a conduit connected to said casing below said rotor to receive oil discharged from said casing, said conduit being interconnected at its opposite end with a zone of lower pressure than that developed in said casing, whereby pressure developed upon discharge of said gas into said casing impels said oil through said flow resisting means.

LEO D. JONES.